US012394897B2

(12) United States Patent
Chang et al.

(10) Patent No.: US 12,394,897 B2
(45) Date of Patent: Aug. 19, 2025

(54) MOBILE DEVICE SUPPORTING WIDEBAND OPERATION

(71) Applicant: Acer Incorporated, New Taipei (TW)

(72) Inventors: Kun-Sheng Chang, New Taipei (TW); Ching-Chi Lin, New Taipei (TW); Chuan-Chun Wang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 204 days.

(21) Appl. No.: 18/347,262

(22) Filed: Jul. 5, 2023

(65) Prior Publication Data

US 2024/0347910 A1 Oct. 17, 2024

(30) Foreign Application Priority Data

Apr. 13, 2023 (TW) ................................ 112113793

(51) Int. Cl.
*H01Q 5/35* (2015.01)
*H01Q 5/50* (2015.01)

(52) U.S. Cl.
CPC ................. *H01Q 5/35* (2015.01); *H01Q 5/50* (2015.01)

(58) Field of Classification Search
CPC ............ H01Q 1/24; H01Q 1/243; H01Q 5/35; H01Q 5/371; H01Q 5/378; H01Q 5/50; H01Q 9/42
See application file for complete search history.

(56) References Cited

U.S. PATENT DOCUMENTS

| | | | | |
|---|---|---|---|---|
| 9,780,456 | B2 | 10/2017 | Tao | |
| 10,135,115 | B2 | 11/2018 | Shih et al. | |
| 11,038,254 | B2 | 6/2021 | Chang et al. | |
| 11,380,977 | B2 * | 7/2022 | Chang | H01Q 5/307 |
| 2021/0044000 | A1 * | 2/2021 | Chang | H01Q 1/38 |

FOREIGN PATENT DOCUMENTS

| | | |
|---|---|---|
| TW | 201507282 A | 2/2015 |
| TW | 201639240 A | 11/2016 |
| TW | 201739103 A | 11/2017 |
| TW | 202107767 A | 2/2021 |

OTHER PUBLICATIONS

Chinese language office action dated Apr. 2, 2024, issued in application No. TW 112113793.

* cited by examiner

*Primary Examiner* — Hoang V Nguyen
(74) *Attorney, Agent, or Firm* — McClure, Qualey & Rodack, LLP

(57) ABSTRACT

A mobile device supporting wideband operations includes a grounding radiation element, a first radiation element, a second radiation element, a third radiation element, a fourth radiation element, a fifth radiation element, and a sixth radiation element. The first radiation element has a first feeding point. The first radiation element is coupled through the second radiation element to the grounding radiation element. The fourth radiation element has a second feeding point. The fifth radiation element is adjacent to the fourth radiation element. The fifth radiation element is coupled through the sixth radiation element to the grounding radiation element. A first antenna structure is formed by the grounding radiation element, the first radiation element, the second radiation element, and the third radiation element. A second antenna structure is formed by the grounding radiation element, the fourth radiation element, the fifth radiation element, and the sixth radiation element.

14 Claims, 3 Drawing Sheets

MOBILE DEVICE SUPPORTING WIDEBAND OPERATION

CROSS REFERENCE TO RELATED APPLICATIONS

This application claims priority of Taiwan Patent Application No. 112113793 filed on Apr. 13, 2023, the entirety of which is incorporated by reference herein.

BACKGROUND OF THE INVENTION

Field of the Invention

The disclosure generally relates to a mobile device, and more particularly, to a mobile device that supports wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may impact the communication quality of the mobile device in question. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a grounding radiation element, a first radiation element, a second radiation element, a third radiation element, a fourth radiation element, a fifth radiation element, and a sixth radiation element. The grounding radiation element is coupled to a ground voltage. The first radiation element has a first feeding point. The first radiation element is coupled through the second radiation element to the grounding radiation element. The third radiation element is disposed adjacent to the first radiation element. The fourth radiation element has a second feeding point. The fifth radiation element is disposed adjacent to the fourth radiation element. The fifth radiation element is coupled through the sixth radiation element to the grounding radiation element. A first antenna structure is formed by the grounding radiation element, the first radiation element, the second radiation element, and the third radiation element. A second antenna structure is formed by the grounding radiation element, the fourth radiation element, the fifth radiation element, and the sixth radiation element.

In some embodiments, the second radiation element substantially has a variable-width straight-line shape and includes a narrow portion and a wide portion. The first radiation element is coupled to the wide portion. The wide portion is coupled through the narrow portion to the grounding radiation element.

In some embodiments, a first coupling gap is formed between the third radiation element and the first radiation element. A second coupling gap is formed between the fifth radiation element and the fourth radiation element. The width of each of the first coupling gap and the second coupling gap is shorter than or equal to 0.5 mm.

In some embodiments, the first antenna structure covers a first frequency band, a second frequency band, a third frequency band, and a fourth frequency band. The first frequency band is from 1805 MHz to 2170 MHz. The second frequency band is from 2300 MHz to 2700 MHz. The third frequency band is from 3300 MHz to 3800 MHz. The fourth frequency band is from 4000 MHz to 5000 MHz.

In some embodiments, the length of the first radiation element is substantially equal to 0.25 wavelength of the first frequency band. The length of the third radiation element is substantially equal to 0.25 wavelength of the fourth frequency band.

In some embodiments, the total length of the grounding radiation element and the second radiation element is substantially equal to 0.25 wavelength of the first frequency band.

In some embodiments, the total length of the first antenna structure and the second antenna structure is substantially equal to 0.5 wavelength of the second frequency band.

In some embodiments, the second antenna structure covers a fifth frequency band, a sixth frequency band, and a seventh frequency band. The fifth frequency band is from 2400 MHz to 2500 MHz. The sixth frequency band is from 5150 MHz to 5850 MHz. The seventh frequency band is from 5925 MHz to 7125 MHz.

In some embodiments, the length of the fourth radiation element is substantially equal to 0.25 wavelength of the sixth frequency band.

In some embodiments, the total length of the fifth radiation element, the sixth radiation element, and the grounding radiation element is substantially equal to 0.25 wavelength of the fifth frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
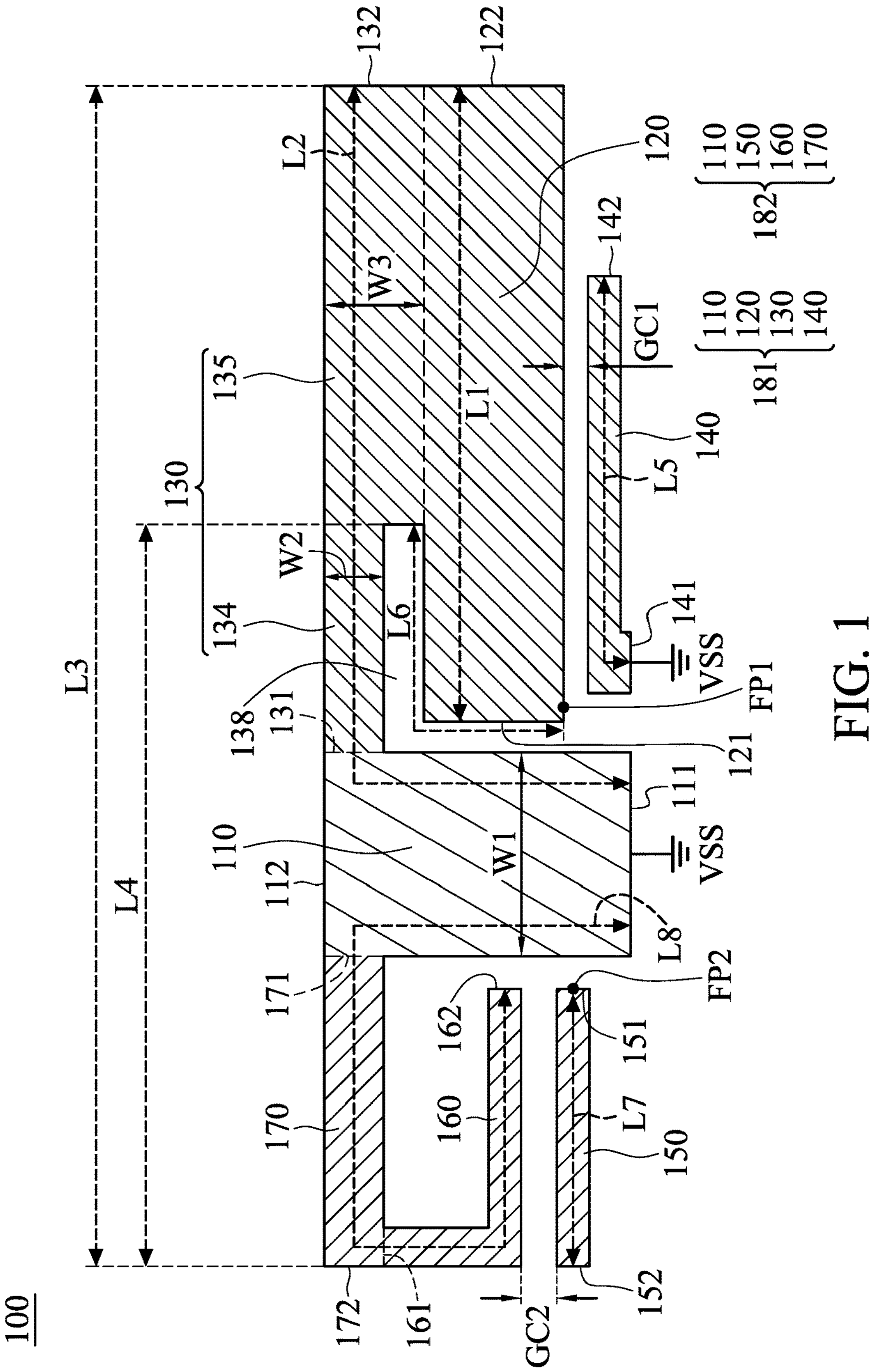
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smartphone, a tablet computer, or a notebook computer. As shown in FIG. 1, the mobile device 100 includes a grounding radiation element 110, a first radiation element 120, a second radiation element 130, a third radiation element 140, a fourth radiation element 150, a fifth radiation element 160, and a sixth radiation element 170. The grounding radiation element 110, the first radiation element 120, the second radiation element 130, the third radiation element 140, the fourth radiation element 150, the fifth radiation element 160, and the sixth radiation element 170 may all be made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

The grounding radiation element 110 may substantially have a relatively wide straight-line shape. Specifically, the grounding radiation element 110 has a first end 111 and a second end 112. The first end 111 of the grounding radiation element 110 is coupled to a ground voltage VSS. For example, the ground voltage VSS may be provided by a system ground plane (not shown) of the mobile device 100, but it is not limited thereto.

In some embodiments, the first radiation element 120, the second radiation element 130, and the third radiation element 140 are all disposed at the same side (e.g., the right side) of the grounding radiation element 110. Furthermore, the fourth radiation element 150, the fifth radiation element 160, and the sixth radiation element 170 are all disposed at the opposite side (e.g., the left side) of the grounding radiation element 110.

The first radiation element 120 may substantially have another relatively wide straight-line shape. Specifically, the first radiation element 120 has a first end 121 and a second end 122. A first feeding point FP1 is positioned at the first end 121 of the first radiation element 120. The first feeding point FP1 may be further coupled to a first signal source (not shown). For example, the aforementioned first signal source may be an RF (Radio Frequency) module.

The second radiation element 130 may substantially have a variable-width straight-line shape. Specifically, the second radiation element 130 has a first end 131 and a second end 132. The first end 131 of the second radiation element 130 is coupled to the second end 112 of the grounding radiation element 110. The second end 132 of the second radiation element 130 is coupled to the second end 122 of the first radiation element 120. That is, the first radiation element 120 is coupled through the second radiation element 130 to the grounding radiation element 110. In some embodiments, the second radiation element 130 includes a narrow portion 134 adjacent to the first end 131 and a wide portion 135 adjacent to the second end 132. The first radiation element 120 is coupled to the wide portion 135, and the wide portion 135 is coupled through the narrow portion 134 to the grounding radiation element 110. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing therebetween is reduced to 0).

In some embodiments, a monopole slot region 138 is surrounded by the grounding radiation element 110, the first radiation element 120, and the second radiation element 130. The monopole slot region 138 has an open end and a closed end. For example, the monopole slot region 138 may substantially have an inverted L-shape, but it is not limited thereto.

The third radiation element 140 may substantially have an L-shape. Specifically, the third radiation element 140 has a first end 141 and a second end 142. The first end 141 of the third radiation element 140 is coupled to the ground voltage VSS. The second end 142 of the third radiation element 140 is an open end. The third radiation element 140 is adjacent to the first radiation element 120. A first coupling gap GC1 may be formed between the third radiation element 140 and the first radiation element 120.

The fourth radiation element 150 may substantially have a straight-line shape. Specifically, the fourth radiation element 150 has a first end 151 and a second end 152. A second feeding point FP2 is positioned at the first end 151 of the fourth radiation element 150. The second end 152 of the fourth radiation element 150 is an open end. For example, the second end 152 of the fourth radiation element 150 and the second end 142 of the third radiation element 140 may substantially extend in opposite directions and away from each other. The second feeding point FP2 may be further coupled to a second signal source (not shown). For example, the aforementioned second signal source may be another RF module.

The fifth radiation element 160 may substantially have an L-shape. Specifically, the fifth radiation element 160 has a first end 161 and a second end 162. The second end 162 of the fifth radiation element 160 is an open end. For example, the second end 162 of the fifth radiation element 160 and the second end 152 of the fourth radiation element 150 may substantially extend in opposite directions and away from each other. The fifth radiation element 160 is adjacent to the fourth radiation element 150. A second coupling gap GC2 may be formed between the fifth radiation element 160 and the fourth radiation element 150.

The sixth radiation element 170 may substantially have another straight-line shape. Specifically, the sixth radiation element 170 has a first end 171 and a second end 172. The first end 171 of the sixth radiation element 170 is coupled to the second end 112 of the grounding radiation element 110. The second end 172 of the seventh radiation element 170 is coupled to the first end 161 of the fifth radiation element 160. That is, the fifth radiation element 160 is coupled through the seventh radiation element 170 to the grounding radiation element 110.

In a preferred embodiment, a first antenna structure 181 of the mobile device 100 is formed by the grounding radiation element 110, the first radiation element 120, the second radiation element 130, and the third radiation element 140. Also, a second antenna structure 182 of the mobile device 100 is formed by the grounding radiation element 110, the fourth radiation element 150, the fifth radiation element 160, and the sixth radiation element 170. In some embodiments, each of the first antenna structure 181 and the second antenna structure 182 may be a planar antenna structure disposed on a dielectric substrate (not shown). For example, the aforementioned dielectric substrate may be an FR4 (Flame Retardant 4) substrate, a PCB (Printed Circuit Board), or an FPC (Flexible Printed Circuit). However, the invention is not limited thereto. In alternative embodiments, each of the first antenna structure 181 and the second antenna structure 182 as mentioned above can be modified to be a 3D (Three-Dimensional) antenna structure.

Figure 2:
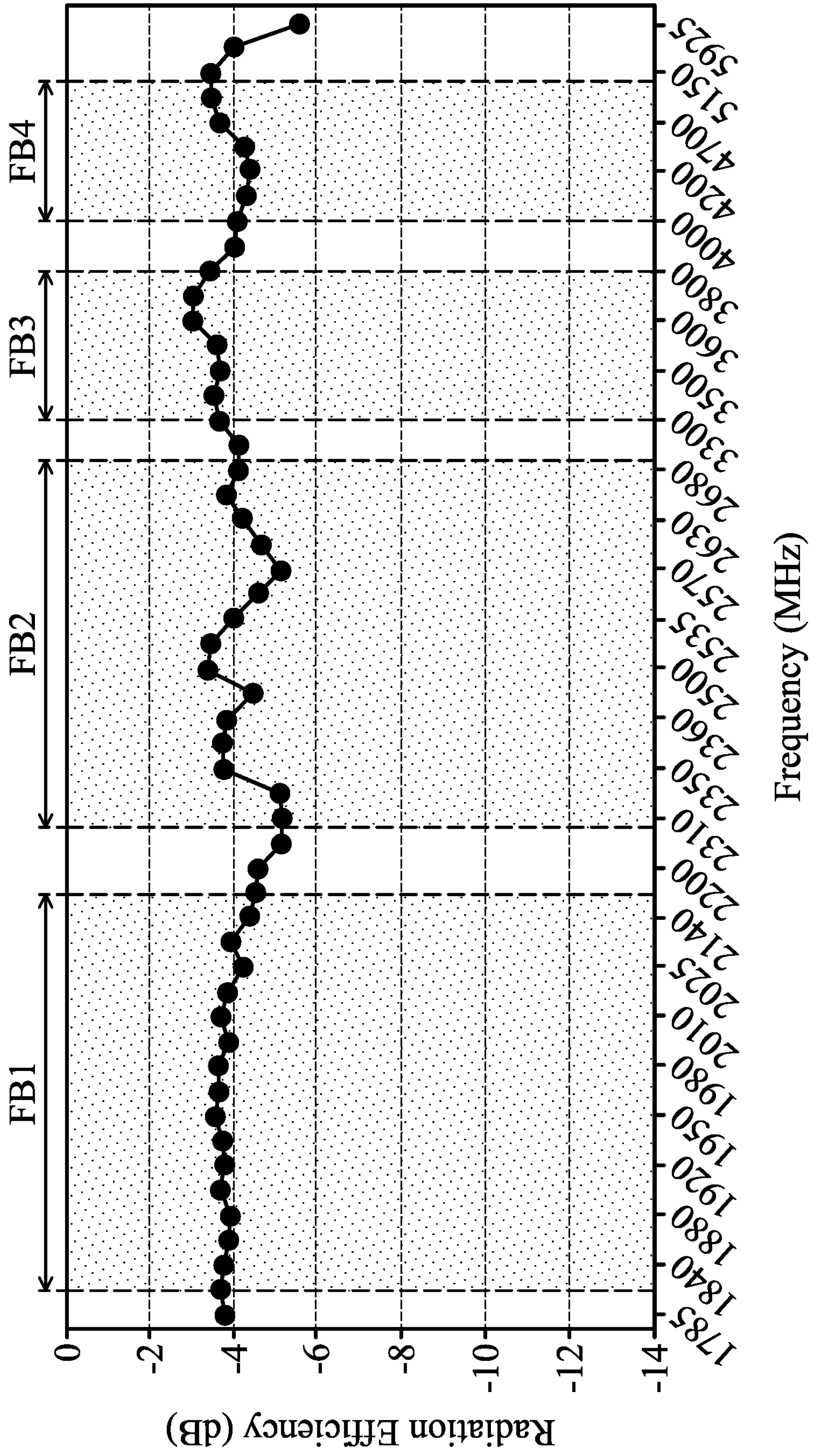
FIG. 2 is a diagram of radiation efficiency of a first antenna structure of a mobile device according to an embodiment of the invention.

FIG. 2 is a diagram of radiation efficiency of the first antenna structure 181 of the mobile device 100 according to an embodiment of the invention. The horizontal axis represents the operational frequency (MHz), and the vertical axis represents the radiation efficiency (dB). According to the measurement depicted in FIG. 2, the first antenna structure 181 of the mobile device 100 can cover a first frequency band FB1, a second frequency band FB2, a third frequency band FB3, and a fourth frequency band FB4. For example, the first frequency band FB1 may be from 1805 MHz to 2170 MHz, the second frequency band FB2 may be from 2300 MHz to 2700 MHz, the third frequency band FB3 may be from 3300 MHz to 3800 MHz, and the fourth frequency band FB4 may be from 4000 MHz to 5000 MHz. Therefore, the first antenna structure 181 of the mobile device 100 can support at least the wideband operations of next-generation 5G (5th Generation Wireless System) communication.

Figure 3:
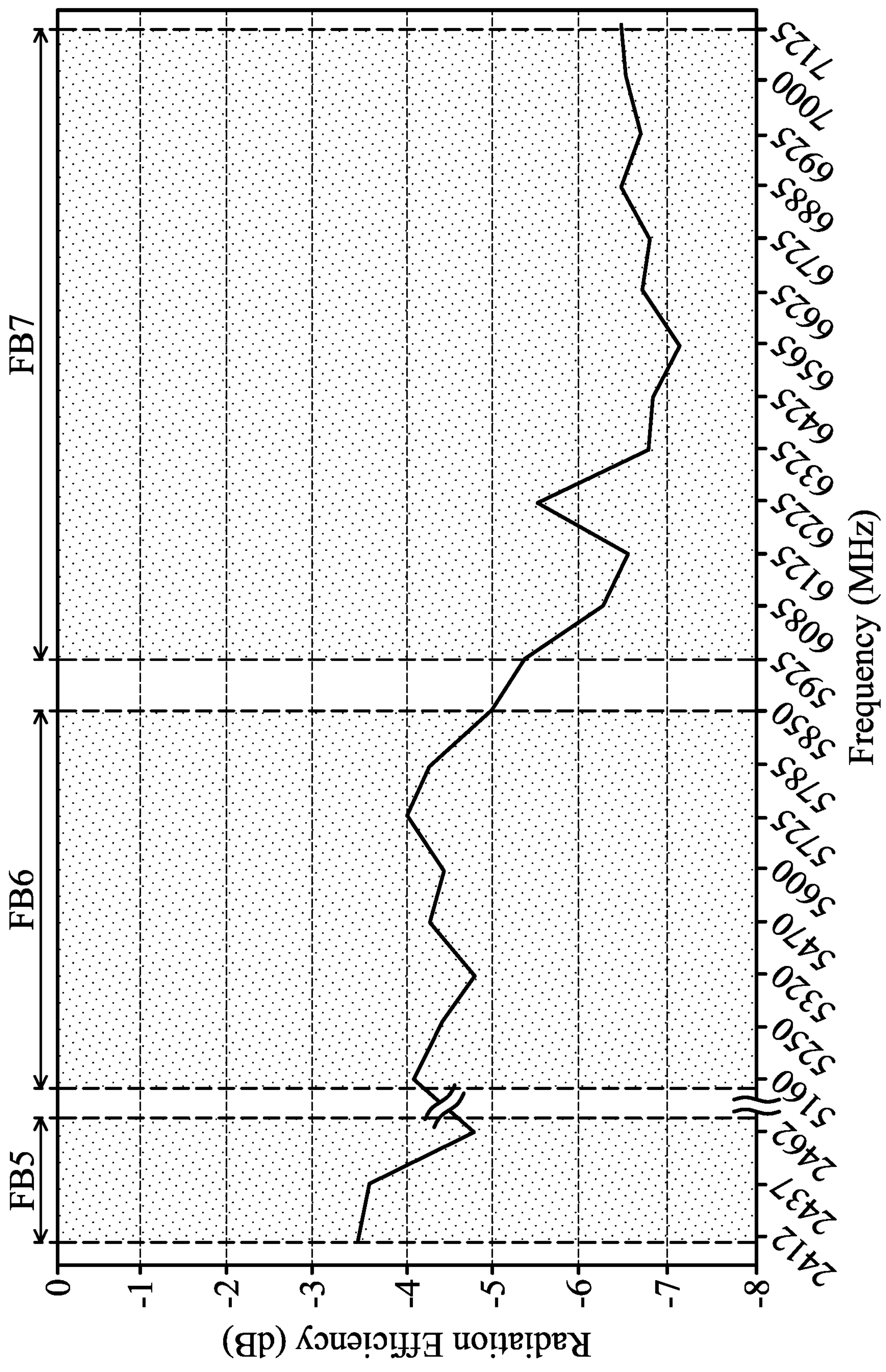
FIG. 3 is a diagram of radiation efficiency of a second antenna structure of a mobile device according to an embodiment of the invention.

FIG. 3 is a diagram of radiation efficiency of the second antenna structure 182 of the mobile device 100 according to an embodiment of the invention. The horizontal axis represents the operational frequency (MHz), and the vertical axis represents the radiation efficiency (dB). According to the measurement depicted in FIG. 3, the second antenna structure 182 of the mobile device 100 can cover a fifth frequency band FBS, a sixth frequency band FB6, and a seventh frequency band FB7. For example, the fifth frequency band FB5 may be from 2400 MHz to 2500 MHz, the sixth frequency band FB6 may be from 5150 MHz to 5850 MHz, and the seventh frequency band FB7 may be from 5925 MHz to 7125 MHz. Therefore, the second antenna structure 182 of the mobile device 100 can support at least the wideband operations of conventional WLAN (Wireless Local Area Network) and next-generation Wi-Fi 6E.

It should be noted that since the first antenna structure 181 is integrated with the second antenna structure 182 in the mobile device 100 of the invention, the overall antenna size can be reduced further. According to practical measurements, the incorporation of the grounding radiation element 110 can help to enhance the isolation between the first antenna structure 181 and the second antenna structure 182. In addition, the variable-width design of the second radiation element 130 is configured to increase the operational bandwidth of the aforementioned first frequency band FB1. The incorporation of the monopole slot region 138 is configured to fine-tune the impedance matching of the aforementioned third frequency band FB3.

In some embodiments, the element sizes of the mobile device 100 are as follows. The length L1 of the first radiation element 120 may be substantially equal to 0.25 wavelength (λ/4) of the first frequency band FB1 of the first antenna structure 181 of the mobile device 100. The total length L2 of the grounding radiation element 110 and the second radiation element 130 may be substantially equal to 0.25 wavelength (λ/4) of the first frequency band FB1 of the first antenna structure 181 of the mobile device 100. The width W1 of the grounding radiation element 110 may be from 5 mm to 8 mm. In the second radiation element 130, the width W2 of the narrow portion 134 may be from 1 mm to 1.5 mm, and the width W3 of the wide portion 135 may be from 2.5 mm to 3.5 mm. The total length L3 of the first antenna structure 181 and the second antenna structure 182 may be substantially equal to 0.5 wavelength (λ/2) of the second frequency band FB2 of the first antenna structure 181 of the mobile device 100. For example, the aforementioned total length L3 may be shorter than or equal to 35 mm. The total length L4 of the sixth radiation element 170, the grounding radiation element 110, and the narrow portion 134 of the second radiation element 130 may substantially equal to 0.5 wavelength (λ/2) of the third frequency band FB3 of the first antenna structure 181 of the mobile device 100. The length L5 of the third radiation element 140 may be substantially equal to 0.25 wavelength (λ/4) of the fourth frequency band FB4 of the first antenna structure 181 of the mobile device 100. The length L6 of the monopole slot region 138 may be from 5 mm to 15 mm. The length L7 of the fourth radiation element 150 may be substantially equal to 0.25 wavelength (λ/4) of the sixth frequency band FB6 of the second antenna structure 182 of the mobile device 100. The total length L8 of the fifth radiation element 160, the sixth radiation element 170, and the grounding radiation element 110 may be substantially equal to 0.25 wavelength (λ/4) of the fifth frequency band FB5 of the second antenna structure 182 of the mobile device 100, or may be substantially equal to 0.5 wavelength (λ/2) of the seventh frequency band FB7 of the second antenna structure 182 of the mobile device 100. The width of the first coupling gap GC1 may be shorter than or equal to 0.5 mm. The width of the second coupling gap GC2 may be shorter than or equal to 0.5 mm. The above ranges of element sizes are calculated and obtained according to many experiment results, and they help to optimize the operational bandwidth and impedance matching of the first antenna structure 181 and the second antenna structure 182 of the mobile device 100.

The invention proposes a novel mobile device with a novel antenna structure. In comparison to the conventional design, the invention has several advantages, including its common ground, small size, wide bandwidth, and low manufacturing cost. Therefore, the invention is suitable for application in a variety of mobile communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-3. The invention may merely include any one or more features of any one or more embodiments of FIGS. 1-3. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a grounding radiation element, coupled to a ground voltage;

a first radiation element, having a first feeding point;

a second radiation element, wherein the first radiation element is coupled through the second radiation element to the grounding radiation element;

a third radiation element, disposed adjacent to the first radiation element;

a fourth radiation element, having a second feeding point;

a fifth radiation element, disposed adjacent to the fourth radiation element; and a sixth radiation element, wherein the fifth radiation element is coupled through the sixth radiation element to the grounding radiation element;

wherein a first antenna structure is formed by the grounding radiation element, the first radiation element, the second radiation element, and the third radiation element;

wherein a second antenna structure is formed by the grounding radiation element, the fourth radiation element, the fifth radiation element, and the sixth radiation element;

wherein the second radiation element substantially has a variable-width straight-line shape and comprises a narrow portion and a wide portion.

2. The mobile device as claimed in claim 1, wherein the first radiation element is coupled to the wide portion, and the wide portion is coupled through the narrow portion to the grounding radiation element.

3. The mobile device as claimed in claim 1, wherein a first coupling gap is formed between the third radiation element and the first radiation element, and a second coupling gap is formed between the fifth radiation element and the fourth radiation element.

4. The mobile device as claimed in claim 3, wherein a width of each of the first coupling gap and the second coupling gap is shorter than or equal to 0.5 mm.

5. The mobile device as claimed in claim 1, wherein the first antenna structure covers a first frequency band, a second frequency band, a third frequency band, and a fourth frequency band.

6. The mobile device as claimed in claim 5, wherein the first frequency band is from 1805 MHz to 2170 MHz, the second frequency band is from 2300 MHz to 2700 MHZ, the third frequency band is from 3300 MHz to 3800 MHZ, and the fourth frequency band is from 4000 MHz to 5000 MHz.

7. The mobile device as claimed in claim 5, wherein a length of the first radiation element is substantially equal to 0.25 wavelength of the first frequency band.

8. The mobile device as claimed in claim 5, wherein a length of the third radiation element is substantially equal to 0.25 wavelength of the fourth frequency band.

9. The mobile device as claimed in claim 5, wherein a total length of the grounding radiation element and the second radiation element is substantially equal to 0.25 wavelength of the first frequency band.

10. The mobile device as claimed in claim 5, wherein a total length of the first antenna structure and the second antenna structure is substantially equal to 0.5 wavelength of the second frequency band.

11. The mobile device as claimed in claim 1, wherein the second antenna structure covers a fifth frequency band, a sixth frequency band, and a seventh frequency band.

12. The mobile device as claimed in claim 11, wherein the fifth frequency band is from 2400 MHz to 2500 MHz, the sixth frequency band is from 5150 MHz to 5850 MHz, and the seventh frequency band is from 5925 MHz to 7125 MHz.

13. The mobile device as claimed in claim 11, wherein a length of the fourth radiation element is substantially equal to 0.25 wavelength of the sixth frequency band.

14. The mobile device as claimed in claim 11, wherein a total length of the fifth radiation element, the sixth radiation element, and the grounding radiation element is substantially equal to 0.25 wavelength of the fifth frequency band.

* * * * *